United States Patent [19]

Trend et al.

[11] Patent Number: 4,941,996
[45] Date of Patent: Jul. 17, 1990

[54] INCLUSION COMPLEXES PROVIDING SECOND HARMONIC GENERATION

[75] Inventors: John E. Trend, St. Paul, Minn.; Kent B. Rochford, Tucson, Ariz.

[73] Assignee: Minnesota Mining and Manufacturing Company, St. Paul, Minn.

[21] Appl. No.: 89,219

[22] Filed: Oct. 19, 1987

[51] Int. Cl.$^5$ .............................................. G02B 5/20
[52] U.S. Cl. ................................. 252/584; 252/582; 252/587; 252/589; 350/1.1
[58] Field of Search ............................... 252/582, 584

[56] References Cited

U.S. PATENT DOCUMENTS

| | | | |
|---|---|---|---|
| 3,371,220 | 2/1968 | Fleury et al. | 307/88.3 |
| 3,395,329 | 7/1968 | Rentzepis | 321/69 |
| 3,895,242 | 7/1975 | Yoshida | 307/88.3 |
| 3,965,375 | 6/1976 | Bergman, Jr. et al. | 307/88.3 |
| 4,199,698 | 4/1980 | Bethea et al. | |
| 4,376,899 | 3/1983 | Chemla et al. | 307/425 |
| 4,426,292 | 1/1984 | Wernick et al. | 210/635 |
| 4,428,873 | 1/1984 | Murayama et al. | 252/583 |
| 4,431,263 | 2/1984 | Garito | 350/96.34 |

OTHER PUBLICATIONS

Tomaru et al., JCS Chem Comm. No. 18, p. 1207, 1984.
"Scientists Seek Nonlinear Optical Materials", Chemical and Engineering News, Oct. 4, 1982, pp. 18–21.
"Proceedings of the First International Symposium on Cyclodextrins", edited by J. Szejtli, D. Reidel Publishing Co. (1981) pp. 291–292.
J. Szejtli, *Cyclodextrins and Their Inclusion Complexes*, Akademia; Kiads (Budapest: 1982) Chapter 1, Sec. 1.5; Chapter 3, Sec. 3.1, 3.2 Journal of Non-Crystalline Solids, 47, 2 (1982) 211–226, 287–290.
Atwood, J. L., J. E. D. Davies & D. D. MACNicol, (Ed): *Inclusion Compounds*, vol. III Academic Press, Ch. 11, "Industrial Applns of Cyclodextrins", J. Szejtli Am Chem. Soc., 190th ACS Natl. Mtng., Chicago, IL; Sep. 8–13, 1985, #43, Removal of Polychlorinated . . .
"Putting the Squeeze on Fruit Juices' Bitter Taste", *Chemical Week*, Apr. 22, 1987, pp. 15–16.
Amaizo Marketing Briefs, "Cyclodextrine Polymers".
Amaizo Marketing Briefs, "Chemically Modified Cyclodextrins".
Amaizo Marketing Briefs, "Cyclodextrin".
"The Structure of the Cyclodextrin Complex . . ." *Bulletin of the Chemical Society of Japan*, vol. 50 (6), 1416–1424 (1977).
"The Structure of the Cyclodextrin Complex. II . . .", Harata, *Bulletin of the Chemical Society of Japan*, vol. 51 (6), 1627–1634 (1978).
"The Structure of the Cyclodextrin Complex VI . . .", Harata, Uedaira, and Tanada, *Bulletin of the Chemical Society of Japan*, vol. 49 (6), 1493–1501 (1976).
J. Chem. Soc., Chem. Commun. (1984) 1207–1208.
Drabovich, et al., "Tunable Resonant . . .", Optics Communications, v. 20, No. 3, Mar. 1977, pp. 350–353.
Williams, "Organic Polymeric . . .", Angew Chem. Int. Ed. Engl. 23 (1984) 690–703.
Davydov, et al., "New Nonlinear . . .", Sov. J. Quantum Electron, vol. 7, No. 1, Jan. 1977.

*Primary Examiner*—John F. Terapane
*Assistant Examiner*—Richard Treanor
*Attorney, Agent, or Firm*—Donald M. Sell; Walter N. Kirn; David L. Weinstein

[57] ABSTRACT

Inclusion complexes, comprising a host and a guest, that exhibit greater second harmonic generation efficiency than either the host or the guest exhibits by itself. Preferred hosts can be selected from cyclodextrins, cyclodextrin derivatives, and cyclodextrin polymers. Preferred guests can be selected from aromatic compounds in which the molecule contains both an electron-donating functional group and an electron-withdrawing functional group.

9 Claims, No Drawings

INCLUSION COMPLEXES PROVIDING SECOND HARMONIC GENERATION

TECHNICAL FIELD

This invention is concerned with materials for nonlinear optical devices for the conversion of optical energy at one frequency to optical energy at another frequency.

BACKGROUND OF THE INVENTION

Nonlinear optical devices, e.g., frequency doublers, optical mixers and parametric oscillators, are of interest in both research and applied projects because of their ability to convert coherent optical radiation at one frequency into coherent optical radiation at another frequency. This ability is of interest because of the opportunities it affords both for expanding the number of wavelengths at which coherent radiation is available and for converting optical energy to a wavelength more convenient for device applications.

Many inorganic materials, such as quartz and lithium niobate, have nonlinear coefficients and exhibit optical nonlinearities. However, because the utility of these materials for device applications is generally proportional, at least at relatively low levels of incident radiation, to the magnitude of the nonlinear coefficients, materials are constantly being sought which exhibit nonlinear coefficients larger than the nonlinear coefficients of know materials and stable operation under diverse conditions, including high intensity incident radiation.

The possibility of using organic molecules in nonlinear optical devices has generated much interest recently because a large number of molecules are available for investigation. Some substituted aromatic molecules are known to exhibit large optical nonolinearities. The possibilty of such an aromatic molecule having large optical nonlinearities is enhanced if the molecule has donor and acceptor groups bonded at opposite ends of the conjugated system.

One such substituted aromatic molecule that is potentially interesting from an optical device point of view is para-nitroaniline. This molecule has a large molecular hyperpolarizability, and is transparent at many wavelengths of interest, including 0.532 $\mu$m, which permits frequency doubling of the commonly used 1.064 $\mu$m wavelength from a Nd:YAG laser. This molecule, however, crystallizes in centrosymmetric polymorphs. Because of this symmetry condition, the second harmonic coefficients are zero.

U.S. Pat. 4,199,698 discloses that the nonlinear optical properties of 2-methyl-4-nitroaniline (MNA) make it a highly useful material in nonlinear devices that convert coherent optical radiation including a first frequency into coherent optical radiation including a second frequency. The nonlinear devices have means for introducing coherent radiation in a first frequency into the MNA and means for utilizing coherent radiation emitted from the MNA at a second frequency.

U.S. Pat. No. 4,431,263 discloses that diacetylenes and polymers formed form diacetylenic species, which are amendable to close geometric, steric, structural, and electronic control, provide nonlinear optic, waveguide, piezoelectric, and pyroelectric materials and devices. Diacetylenes which are crystallizable into crystals having a noncentrosymmetric unit cell may form single crystals or may be elaborated into a thin film upon a substrate by the Langmuir-Blodgett technique. Such films may be polymerized either thermally or by irradiation for use in nonlinear optical and other systems. Diacetylenes are covalently bonded to substrates through the employment of silane species subsequently polymerized to yield nonlinear optic and other devices having high structural integrity in addition to high efficiencies and optical effects.

SUMMARY OF THE INVENTION

This invention involves inclusion complexes comprising a host and a guest, which complexes exhibit greater second harmonic generation (SHG) efficiency than either said host or said guest exhibits by itself. The inclusion complex is preferably a solid. The complex must be non-centrosymmetric, and it must have a non-zero second order molecular hyperpolarizability. The host is preferably a non-centrosymmetric clathrating agent. The uncomplexed guest can have centrosymmetric or non-centrosymmetric crystalline forms, and it preferably has a non-zero second order molecular hyperpolarizability. Preferred hosts are selected from cyclodextrins, cyclodextrin derivatives, and cyclodextrin polymers. Preferred guests are selected from aromatic compounds whose molecules contain both and electron-donating functional group and an electron-withdrawing functional group.

The complexes can be used to determine whether a non-centrosymmetric crystal grown from the guest will exhibit a sizable SHG efficiency compared to the efficiency of urea, which has a relative SHG efficiency equal to one (1.0). The complexes can themselves be used to generate second harmonics.

DETAILED DESCRIPITON

As used herein, "clathrating agent" means a first molecule or molecules which completely enclose a second molecule in such a way that the escape of said second molecule is prevented unless the forces which bind said second molecule's surroundings together are overcome; "host" means clathrating agent; "guest" means a molecule capable of fitting in or occupying the spaces or cavities of a clathrating agent; "inclusion complex" means entities comprising two or more molecules, in which one of the molecules, the host, includes, totally or in part, only by physical forces, i.e. without covalent bonding, a guest molecule; "centrosymmetric" means that inversion symmetry is present; "non-centrosymmetric" means that inversion symmetry does not exist; "second order molecular hyperpolarizability" means a tensor describing the second order nonlinear optical response of a molecule and is defined and described in an article entitled "Scientists Seek Nonlinear Optical Materials", Chemical and Engineering News, Oct. 4, 1982, pp. 18–21, incorporated herein by reference.

The inclusion complex of the present invention is preferably a solid. It must be non-centrosymmetric regardless whether the uncomplexed guest has centrosymmetric on non-centrosymmetric crystalline forms. The host, which may be centrosymmetric or non-centrosymmetric, has the effect of imposing net non-centrosymmetry on the resultant inclusion complex.

The complex must be sufficiently transparent to incident electromagnetic radiation in the specified range so that efficiency of second harmonic generation can be detected by conventional SHG detection devices. For example, if incident radiation is infrared, such as, for example, where the wavelength is 1.064 $\mu$m, and the wavelength of the generated second harmonic is 0.532 $\mu$m, the complex must allow sufficient radiation to pass at both wavelengths to detect at least one photon of 0.532 $\mu$m wavelength light. Likewise, if incident radiation is visible, such as, for example, where the wavelength is 0.532 $\mu$m, and the wavelength of the generated second harmonic is 0.266 $\mu$m, the complex must allow sufficient radiation to pass at both wavelengths through it to detect at least one photon of 0.266 $\mu$m wavelength light.

The host, or clathrating agent, is preferably non-centrosymmetric. Non-centrosymmetry of the host insures that the complex will be non-centrosymmetric. It is preferred that the host be of such molecular structure that it will trap guest molecules within spaces or cavities of its structure. It should also be noted, however, that it is sufficient if the guest molecules are trapped between two or more adjacent host molecules. Generally, it is preferred that host molecules should have cavities large enough to trap guest molecules having the size of one or two benzene rings, or even larger ones carrying a side chain of comparable size, but not so large as to allow the guest to assume totally random orientation within the array of the complex. Alternatively, excessively large cavities can be filled with either spacer molecules which do not contribute any second order effects, such as, for example, cyclohexane, or a second guest molecule that provides a favorable synergism by bi-molecular interaction with the first guest molecule may be incorporated in the host. The typical cavity size of host molecules suitable for this invention typically ranges from about 4.7 Å to about 10 Å in diameter, and from about 175 Å$^3$ to about 510 Å$^3$ in volume.

The host is preferably selected from the cyclodextrin family. The preferred cyclodextrin for use in this invention is a monomeric torus-shaped oligosaccharide composed of alpha-1,4-linkages, preferably of at least six glucose units, most preferably 6-8 gluocose units, wherein a Greek letter denotes the number of units, e.g., alpha for 6, beta for 7, gramma for 8, etc.

A pictorial representation of the chemical structure of the uncomplexed alpha-cyclodextrin molecule (six glucose units) is depicted in FIG. 1 of U.S. Pat. No. 4,426,292, incorporated herein by reference for the description of cyclodextrins. Six primary hydroxyl groups lie on one side of the torus and twelve secondary hydroxyl groups on the other side. In known crystal structures, the central cavity of the molecule is slight "V" shaped, with the secondary hydroxyl side more open than the primary hydroxyl side. The cavity is lined with non-polar groups and has a suitable free diameter of 5 angstroms for binding not only alkanes, but also aromatic compounds and other molecules of similar size. Beta-cyclodextrin and gamma-cyclodextrin with seven and eight glucose units, respectively have a similar torus structure but with a larger central hole (7.5-10 angsroms) to accommodate branched compounds and compounds of larger size.

Cyclodextrins and water soluble, and can be readily crosslinked, similarly to polysaccharide-based resins. The bead polymers obtained from cyclodextrins possess cavities of well-defined size inside the beads. Inclusion complexes made from cyclodextrins are usually less soluble in water than the uncomplexed cyclodextrin, thus allowing the complex to be readily isolated.

The cylodextrins useful herein may be underivatized or derivatized by converting one or more hydroxyl groups of the cyclodextrin to another functional group. Examples of suitable cyclodextrin derivatives include ethers, esters such as acetates, thiols, carbamates, and the like, many of which are already known. See, for example, "Proceedings of the First International Symposium on Cyclodextrins", edited by J. Szejtli, D. Reidel Publishing Company (1981), pp. 291-292, incorporated herein by reference. The term "cyclodextrin derivatives" denotes compounds which contain only one or two cyclodextrin rings; those containing three or more units are termed cyclodextrin polymers, as their molecular weights exceed 3000.

Cyclodextrin polymers, e.g., homopolymers and copolymers of acryloyl $\beta$-cyclodextrin, and amyloses are also suitable for this invention. If the inclusion complex is a polymer, it must be substantially crystalline.

Important characteristics of the preferred cyclodextrins are shown in Table I:

TABLE I

| Cyclodextrin | Cavity diameter, Å | Cavity volume (Å)$^3$ | Guests that will fit within cavity |
|---|---|---|---|
| $\alpha$-cyclodextrin [100015-20-e] (6 glucose units) | 4.7-6.0 | 176 | cyclohexane, $Cl_2$, $Br_2$, $I_2$, biphenyl, propionic acid, butyric acid |
| $\beta$-cyclodextrin [7585-39-9] (7 glucose units) | 7.5-8.0 | 346 | cyclohexane, naphthalene, $Br_2$, $I_2$, biphenyl, butyric acid |
| $\gamma$-cyclodextrin [17465-86-0] (8 glucose units) | 9.0-10.0 | 510 | cyclohexane, naphthalene, anthracene, $I_2$, biphenyl |

Naphthalene is to bulky for $\alpha$-cyclodextrin, and anthracene fits only in $\gamma$-cyclodextrin. On the other hand, propionic acid is well compatible with $\alpha$-cyclodextrin, but apparently may not be trapped or remain trapped in the larger cavities of $\beta$-cyclodextrin and $\gamma$-cyclodextrin.

Cyclodextrins are known to crystallize in two general lattice types, i.e., cage and channel lattices. In channel lattices the cyclodextrin toruses are stacked directly on top of each other, forming continuous, approximately cylindrical channels. In cage lattices, on the other hand, the cyclodextrin toruses lie at angles to one another or are stacked in brickwork fashion so that there are no obvious continuous channels which would be receptive to guest molecules. A comprehensive discussion concerning cage lattices and channel lattices can be found in J. Szejtli, *Cyclodextrins and Their Inclusion Complexes*, Akademia; Kiado (Budapest: 1982), Chapter 3, especially section 3.2 thereof, incorporated herein by reference. U.S. Pat. No. 4,426,292 also describes cage lattices and channel lattices.

The preparation of cyclodextrins is known in the art and comprises the following main steps:

(1) cultivation of a microorganism producing cyclodextrin transglycosylase (CTG) enzyme;
(2) separation of the enzyme from the liquor, its concentration and purfication;
(3) enzymic conversion of prehydrolyzed starch to a mixture of cyclic and linear dextrins;
(4) separation of cyclodextrins from the conversion mixture, its purification and crystallization.

A comprehensive discussion concerning methods of preparing cyclodextrins can be found in J. Szejtli, supra, Chapter 1, especially section 1.5 thereof, incorporated herein by reference. U.S. Pat. No. 4,426,292 also describes methods of preparing cyclodextrins. Cyclodextrins are also commercially available from manufacturers such as Aldrich and Chemical Dynamics.

Polymerization of certain derivatives (e.g. acrylates) of cyclodextrins give homopolymers. Cyclodextrin copolymers are typically produced by the reaction of cyclodextrin and some bi- or polyfunctional compound, which can couple with the hydroxyl groups of cyclodextrin.

Cyclodextrins are capable of forming inclusion complexes with compounds having a size compatible with the dimensions of the cavity therein. The extent of the complex formation is also affected by the polarity of the guest molecule. A polar molecule, particularly molecules with hydrogen bonding functionality such as imparted by hydroxy or amino groups, interact strongly with the hydroxy periphery of the open secondary hydroxyl edge of the cyclodextrins. Complex formation with molecules significantly larger than the cavity may also be possible in such a way that only certain groups or side chains penetrate into the carbohydrate channel. Guest molecules can also be trapped between two or more cyclodextrin molecules.

The crystal lattice of preferred cyclodextrins are stable even if only a part of the cavities are occupied, i.e. when the host's cavity is only partially penetrated. Stability is preferred, as thermal energy imparted by lasers may weaken cyclodextrin complexes.

Another host material suitable for the present invention is amylose.

The linear, non-branched molecule of amylose is made up of several hundreds of several thousands of glucopyranose units with glycosidic bonds exclusively of the α-1,4-type. Amylose is an industrial product which can be purchased in about 90% purity.

In the solid state amylose may have linear-crystalline, helical, or amorphous structure. The linear-crystalline form is characteristic of retrograded amylose, the helical of inclusion complexes. An amorphous substance is produced when amylose is precipitated from its aqueous solution by dehydrating agents under specific conditions. While cyclodextrins form both channel and cage-like structures, amylose forms channel structures only.

The guest preferably has non-zero second order molecular hyperpolarizability, and it, in crystalline form, can be either centrosymmetric or non-centrosymmetric, but it is preferred that the guest not have a non-centrosymmetric crystalline form. It is also preferred that the size of the guest molecule must be such that it can fit within the cavities of the host molecule. However, it is sufficient if guest molecules can be entrapped between two or more host molecules.

Guest molecules that have been found to be particularly useful in this invention are aromatic molecules containing both electron-donating and electron-withdrawing functional groups. As used herein, "electron-donating functional groups" are those groups having a Hammett sigma ($\sigma$) parameter less than zero. Examples of such groups are alkyl, alkoxy, amino, hydroxy, thio, alkylthio, and alkylamino. "Electron-withdrawing functional groups" are those groups having a Hammett $\sigma$ parameter greater than zero. Examples of such groups are halo, acyl, cyano, nitro, sulfonyl, and haloalkyl. The Hammett sigma parameter is discussed in L. P. Hammett, *Physical Organic Chemistry*, McGraw Hill (New York; 1970), pp. 353–357.

Position of the electron-donating and electron-withdrawing functional groups also affects the value of the Hammett $\sigma$ parameter. It is most preferred that the electron-donating functional group and the electron-withdrawing functional group be located para- to each other. While less preferred, it is acceptable if the electron-donating functional group and the electron-withdrawing functional group are located meta- to each other.

In addition to molecules having both electron-withdrawing and electron-donating functional groups, molecules having either electron-donating groups or electron-withdrawing functional groups can also be used. Molecules having only electon-donating functional groups used in conjunction with molecules having only electron-withdrawing functional groups are also useful in this invention. So long as the host molecule or matrix contributes to induce hyperpolarizability in the guest molecule, the inclusion complex will exhibit enhanced second order effects.

The preparation of inclusion complexes is simple. The most common procedure is to stir or shake an aqueous solution of cyclodextrin (cold or warm; neutral or acidic) with the guest molecule or its solution. This may be carried out by using a common solvent, different but miscible solvents, different immiscible solvents, or no solvent at all.

A provided guest molecule is generally added to a warm cyclodextrin solution. An equilibrium is reached with intense stirring if the resulting solution is heterogeneous or under slow cooling in a few hours if the solution is homogeneous. The guest molecule content cannot be increased by repeating the process, i.e. by reheating and cooling. After having attained the equilibrium, water can be removed by freeze-drying, spray-drying or by any other suitable method, or the mother liquor is separated by filtration.

Another method for the preparation of complexes is the so-called kneading. In this case the cyclodextrin is not dissolved; it is kneaded with a small amount of water to which the guest component has been added without a solvent. Preparation of inclusion complexes is described in detail in Szejti, supra, Chapter 3, especially Section 3.1, incorporated herein by reference.

Complexes were evaluated using the SHG powder test described in Kurtz et al., J. Appl. Phys. 1968, 39, 3798. Each host compound and each guest compound was ground and sieved and then mixed with a fluid, i.e., a liquid, to minimize refraction caused by differences in the index of refraction between the particles and the ambient. The index-matched sample was placed between cell flats spaced 0.2 mm apart. Two particle sizes were examined. One particle size was several coherence lengths so that only phase-matched orientations would contribute to the SHG; smaller-sized particles are used to measure non-phase-matchable SHG.

Infrared radiation at 1064 nm from a Q-switched Nd-YAG laser was weakly focused onto the cell containing the prepared sample. An infrared blocking filter placed behind the sample allowed only the second harmonic or frequency-doubled radiation to pass through a ½ meter monochrometer tuned at 532 nm. The output of the monochrometer was directed to a cooled photomultiplier tube, and the resulting signal was processed by a boxcar averager that averages over many laser pulses. The resulting signals were compared to the second harmonic signal of a powdered sample of urea under the same conditions.

The following examples are meant to illustrate, but not limit this invention. Parts and percentages are by weight unless otherwise indicated.

EXAMPLE 1

1.15 g beta-cyclodextrin and 0.2 g of 4-nitroaniline were added to 100 ml water, and the resulting mixture was heated at 80° C. until both materials had dissolved. The solution was allowed to cool slowly and allowed to stand at ambient temperature (about 20° C.) for one week. The crystalline solid was then filtered, washed thoroughly with ethyl ether, and dried. The yield was 0.125 g. An ultraviolet spectrum confirmed that the complex was a 1:1 adduct with 3 or 4 waters of hydration. The SHG efficiency was 1.64, relative to the SHG efficiency of urea.

EXAMPLE 2

The complexes in Table II prepared according to the procedure set forth in Example 1. Table II also shows the amounts of host and guest used, the mole ratio of host to guest, and SHG efficiencies.

TABLE II

| Host | Guest | Ratio of guest to host | SHG efficiency* | Phase matchability | Refractive index** |
|---|---|---|---|---|---|
| α-cyclodextrin | none | — | <0.001 | — | 1.58 |
| β-cyclodextrin | none | — | 0.001 | — | 1.47, 1.58, 1.63 |
| α-cyclodextrin | carbon disulfide | 2:1 | 0.2 | yes | 1.58 |
| β-cyclodextrin | 4-nitroaniline | 1:1 | 1.64 | yes | 1.63 |
| β-cyclodextrin | 5-nitroindoline | 1:1 | 0.19 | no | 1.63 |
| β-cyclodextrin | 4-nitrophenol | 1:1 | 0.11 | yes | 1.63 |
| α-cyclodextrin | methyl orange, sodium salt | 1:2 | 0.01 | — | 1.63 |
| β-cyclodextrin | 4-(N,N-dimethylamino)-benzylidene-2'-hydroxyaniline | 1:2 | 0.12 | no | 1.63 |

*Efficiency means efficiency relative to urea, which has a relative SHG efficiency equal to one (1.0).
**Matching fluids: 1.47, mineral oil; 1.58, Cargille optical matching fluid; 1.63, Cargille optical matching fluid or Convalex 510 pump oil Second order effects, including SHG, are zero for the guests in Table II because the guest is a liquid and amorphous (i.e., carbon disulfide) or when crystalline, the guest crystallizes in centrosymmetric space groups.

From the data set forth in Table II, it can be seen that the SHG efficiencies of the guests are increased from zero to 0.01 in the case of the sodium salt of methyl orange to 1.64 in the case of 4-nitroaniline. Thus, it can be concluded that inclusion complexes wherein the host is cyclodextrin have second-order effects exceeding those of cyclodextrin alone or the guest alone. One advantage of this finding is that materials which are useless in second harmonic generation because they have no non-centrosymmetric crystalline form can be made useful by the formation of cyclodextrin inclusion complexes. Materials which cannot be studied for SHG because no non-centrosymmetric form is available can be made suitable for study by complexation with a cyclodextrin.

Various modifications and alterations of this invention will become apparent to those skilled in the art without departing from the scope and spirit of this invention and it should be understood that this invention is not to be unduly limited to the illustrative embodiments set forth herein.

What is claimed is:

1. A process for converting a fixed fundamental frequency of coherent laser light into a second harmonic frequency which comprises passing said laser light through a nonlinear optical element comprising a non-centrosymmetric host material, selected from the group consisting of cyclodextrins, cyclodextrin polymers, and amyloses, and guest material, selected from the group consisting of 5-nitroindoline, 4-nitrophenol, the sodium salt of methyl orange, and carbon disulfide, entrapped within the molecular structure of said host material or entrapped between two or more adjacent molecules of said host materials, said complex having a non-zero second order molecular hyperpolarizability, said complex further exhibiting greater second harmonic generation efficiency than either said host material or said guest material exhibits alone, said complex being transparent to said fixed fundamental frequency and to said second harmonic frequency.

2. The process of claim 1 wherein the laser is a Nd-YAG laser.

3. The process of claim 1 wherein said guest material has a non-zero second order molecular hyperpolarizability.

4. The process of claim 1 wherein said guest material is 5-nitroindoline.

5. The process of claim 1 wherein said guest material is 4-nitrophenol.

6. The process of claim 1 wherein said guest material is the sodium salt of methyl orange.

7. The process of claim 1 wherein said guest material is carbon disulfide.

8. The method of claim 1 wherein said laser light is infrared radiation.

9. The method of claim 1 wherein said laser light is visible radiation.

* * * * *